United States Patent Office 3,623,318
Patented Nov. 30, 1971

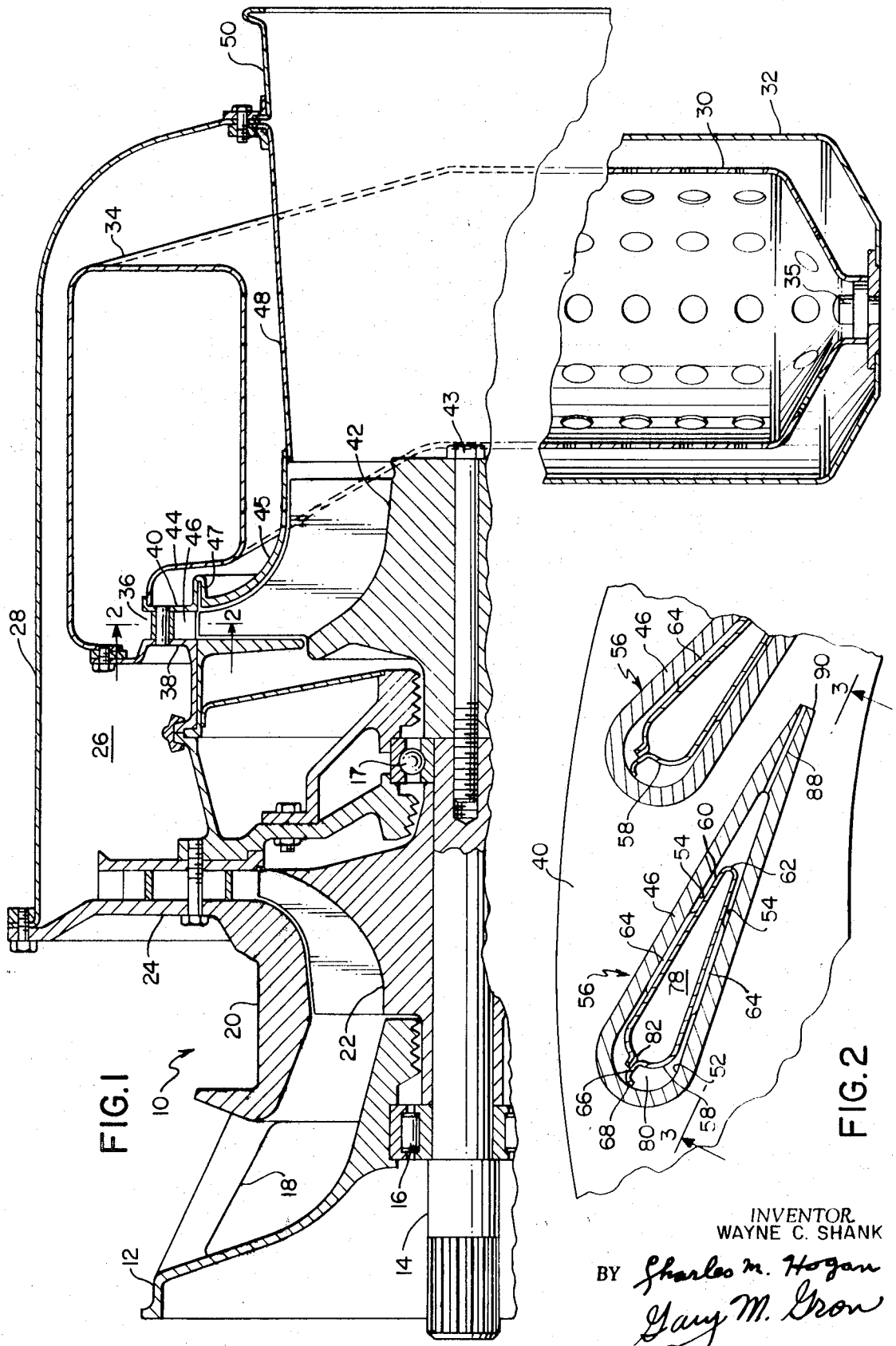

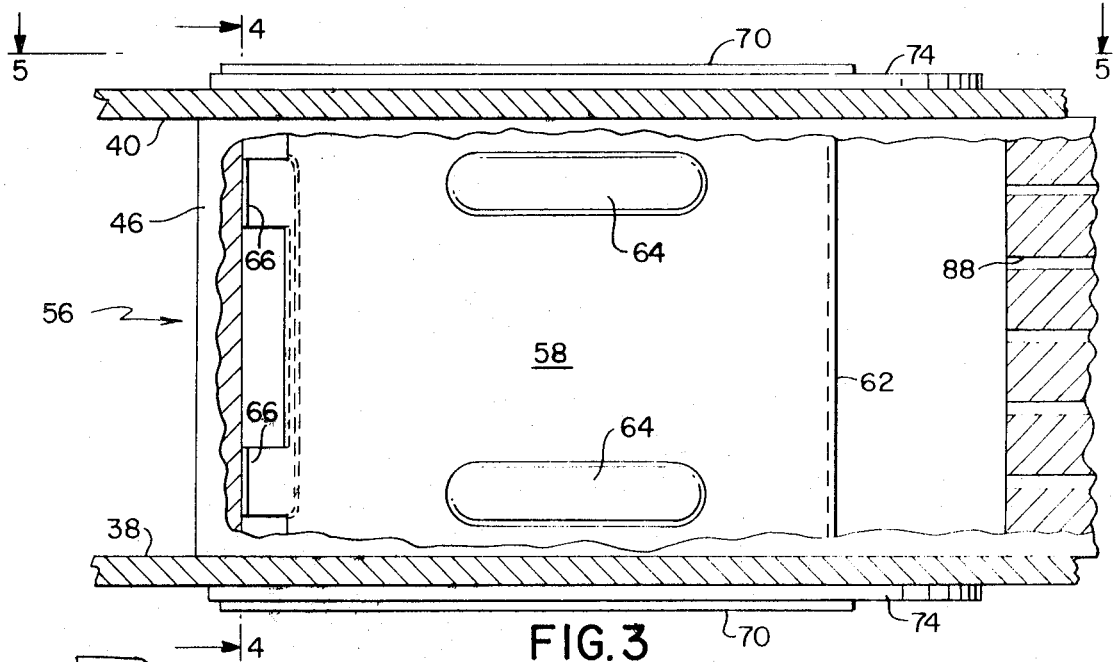
FIG. 3
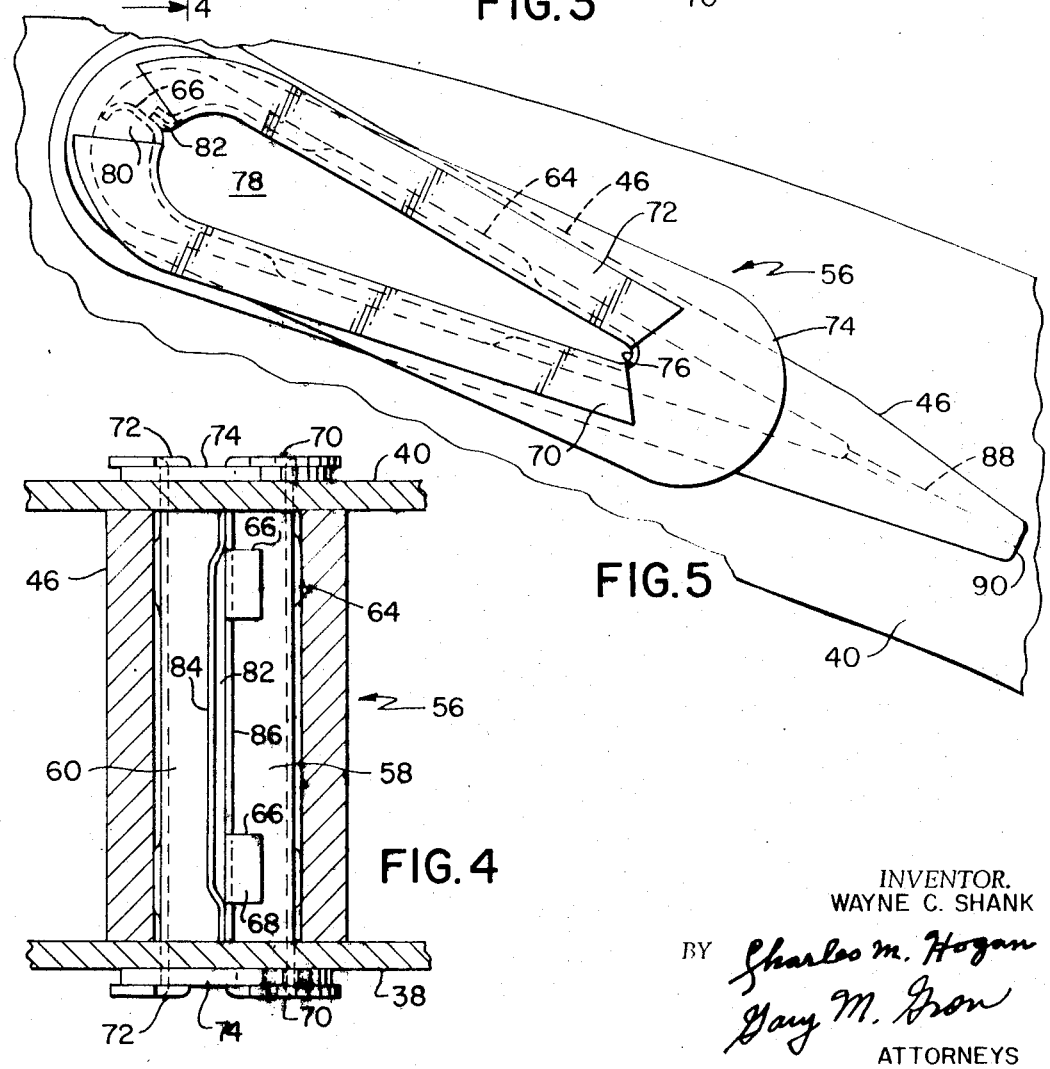
FIG. 5
FIG. 4
INVENTOR.
WAYNE C. SHANK
BY Charles M. Hogan
Gary M. Gron
ATTORNEYS

3,623,318
TURBINE NOZZLE COOLING
Wayne C. Shank, Williamsport, Pa., assignor to
Avco Corporation, Williamsport, Pa.
Filed June 29, 1970, Ser. No. 50,832
Int. Cl. F02c 3/08, 7/12
U.S. Cl. 60—39.66
13 Claims

ABSTRACT OF THE DISCLOSURE

The disclosure illustrates an air-cooled turbine nozzle assembly for use with a centripetal turbine. A simplified one-piece insert baffle comprises folded sheets defining a slot at their free ends to provide impingement cooling of an opening through a series of vanes that make up the nozzle assembly. The baffle with positioning washers defines a through passage for the nozzle vanes which is so positioned that air passes through the nozzles and cools a portion of a duct connected to the turbine nozzle assembly.

---

This invention relates to turbine nozzle assemblies and more specifically to cooling of this type of nozzle.

In recent years the centripetal turbine has been looked on with favor as a simplified and inexpensive turbine assembly for low-cost gas turbine engines. In attempting to increase the efficiency of engines in which this type of turbine is used, the temperatures of the hot gas stream passing across the turbine have been increased. One of the problems resulting from such an approach is that the materials commonly used for centripetal wheels cannot withstand these temperatures for prolonged periods of time.

Accordingly, it is an object of the present invention to provide cooling for a turbine nozzle assembly which enables the assembly to operate for prolonged period at elevated temperatures.

These ends are achieved by a turbine nozzle assembly for a centripetal turbine wheel. A plurality of generally airfoil shaped vanes are positioned around the periphery of the turbine wheel and have their ends supported by first and second spaced walls of a duct which directs flow of a hot gas stream from a combustor toward the turbine wheel. The second wall has a portion that curls radially inward adjacent the outlet portion. Openings are formed through the walls and the vanes and a cooling air flow path is provided to the first wall so that a flow of air passes through the vanes from the first toward the second wall. A relatively small portion of the air passing through the vanes is bled into the hot gas stream so that sufficient air flows through the cooling passages to cool the curled portion of the second wall. In a more specific aspect of the present invention the above nozzle assembly is provided with a simplified baffle in the interior of the vanes to direct flow of the cooling air.

The above and other related objects and features of the present invention will be apparent from a reading of the description of the disclosure shown in the accompanying drawings and the novelty thereof pointed out in the appended claims.

In the drawings:

FIG. 1 is a longitudinal section view of a gas turbine engine which incorporates the turbine nozzle cooling of the present invention;

FIG. 2 is a greatly enlarged fragmentary view of the turbine nozzle assembly of the engine of FIG. 1 and taken on lines 2—2 of that figure;

FIG. 3 is a side view of a turbine nozzle vanes of the engine of FIG. 1, taken on lines 3—3 of FIG. 2;

FIG. 4 is a view taken on lines 4—4 of FIG. 3; and

FIG. 5 is a view taken on lines 5—5 of FIG. 3.

Referring now to FIG. 1, there is shown a gas turbine engine 10 comprising a forward annular casing 12 in which shaft 14 is journaled by means of bearing assembly 16. A second bearing assembly 17 journals the aft end of shaft 14. A series of struts 18 connect the forward housing 12 to a compressor housing 20. A centrifugal compressor comprising a bladed rotor 22 is mounted on shaft 14 for rotation in compressor housing 20. Air passing across the bladed rotor 22 is accelerated and discharged into a radially outwardly extending diffuser assembly 24. The pressurized air discharged from the diffuser assembly 24 passes into a chamber 26 formed on its exterior side by a casing 28 bolted to compressor diffuser assembly 24.

The compressed air passes through casing 28 to a perforated combustor 30 positioned tangentially with respect to the axis of rotation of the engine. The casing 28 has a bulged portion 32 which surrounds the exterior of the combustor 30. A fuel nozzle 35 receives fuel from a suitable source and injects it into combustor 30 where it is mixed with air and ignited to provide a hot gas stream. From there the hot gas stream enters a scroll-like duct 34 which has an annular radially inwardly directed outlet 36. The outlet 36 connects with first and second radially positioned walls 38 and 40, respectively, which define the bounds of a flow path into the periphery of a centripetal bladed turbine wheel 42, mounted for rotation on shaft 14 by bolt 43. It should be noted that the second wall 40 connects with an adjacent portion of the duct 34 which curves radially inward for a short extent at 44.

As hereinshown the combustor 30 is a tangential combustor. However, it will be apparent to those skilled in the art as this discussion proceeds that other types of combustors, such as annular combustors, can be substituted and still retain the advantages of the present invention.

A plurality of vanes 46 extend between the first and second walls 38 and 40. As shown herein, the vanes are cast integrally with the walls. However, they may be fabricated from separate elements and achieve similar results. The vanes 46 are airfoil shaped and are positioned so that the air passing across them is given a substantial tangential component to impart rotation to the bladed turbine wheel 42.

The hot gas stream which passes across the bladed turbine wheel 42 causes it to rotate. The hot gas stream is retained in the bladed portion of turbine wheel 42 by an annular shroud 45, integral with wall 40. A generally U-shaped portion 47 connects wall 40 with shroud 45 to minimize the build-up of thermal stress between the two sections. The gas stream then is discharged through an exhaust duct 48 extending from shroud 45 to an outlet 50 on casing 28.

During operation of the engine, the turbine nozzle vanes 46 and the inner portion 44 of the duct 34 are subjected to extremely high temperatures. In accordance with the present invention these components are maintained at temperature levels which enable prolonged operation. The present invention consists of a cooling system as described below.

The vanes 46 each have a longitudinal opening 52 which extends through the first wall 38, through the vanes 46 and through the second wall 40. This opening generally follows the shape of the exterior of the vane 46 and has side walls 54 that converge toward the aft end of the vane 46. A baffle assembly 56 is positioned in each of the longitudinal openings 52 to direct the flow of cooling air, as later described.

As shown particularly in FIGS. 3, 4 and 5, the baffle 56 comprises a unitary folded sheet element having side walls 58, 60 respectively. The crease 62 is longitudinally positioned adjacent the aft end of the vanes and the edges of the side walls 58, 60 are longitudinally positioned adjacent the forward end of the vane. The baffle 56 is positioned in a fore and aft direction by integral ribs 64 in the side walls 58, 60 that abut the converging side walls 54 of the opening 52. The ribs 64 are kept in abutment with the side walls 54 by positioning tabs 66 extending from the free edge of wall 58. The positioning tabs 66 have a curved portion 68 which abuts the forward end of the opening 52.

The baffle 56 is positioned with respect to the longitudinal axis of the opening 52 by a series of tabs 70, 72, respectively extending from the ends of walls 58, 60. The tabs 70, 72 extend through openings 76 in washers 74 which abut the outer sides of walls 38, 40. These tabs 70, 72 are bent over the washers 74 to lock the baffle 56 in place. This operation is conveniently formed with simple manufacturing tools.

The baffle 56, in cooperation with the washers 74, and the opening 52 form a central through passage 78 through the vane and a chamber 80 defined by the walls of the baffle 56 and the opening 52. A controlled opening is provided between through passage 78 and chamber 80 by a slot 82 provided at the ends of side walls 58, 60 of the baffle 56. The slot 82 is formed by forming a bulged lip 84 on the wall 60 which abuts a corresponding lip 86 on the wall 58. Bleed passages are provided between chamber 80 and the hot gas stream passing over the vanes 46 by a series of holes 88 extending from the aft end of opening 52 to the blunt aft end 90 of the vanes 46.

In operation, rotation of the compressor 22 pressurizes air within chamber 26 for delivery to combustor 30. There is a pressure differential between the air adjacent the wall 38 and the air adjacent the wall 40 due to the losses caused by the flow of air over and around the duct 34. In addition, the pressure in chamber 26 is greater than the pressure of the hot gas stream passing across the vanes 46 of the turbine nozzle assembly.

These pressure differentials cause a flow of cooling air through the passageway 78 from wall 38 toward wall 40. The resultant through flow causes cooling air to impinge on the curled portion 44 of duct 34. This cooling air not only lowers the temperature of the curled portion 44 of the duct 34 but additionally is made available for use in the combustor 30.

The area of the holes 88 and the slot 82 are selected so that a small portion of the air flowing through the internal passageway 78 is bled into the hot gas stream flowing across the vanes 46. The air flowing from slot 82 to chamber 80 cools the forward end of the vane 46 by internal impingement cooling. Air flowing through chamber 80 in the gap between baffle walls 58, 60 and opening 52 cools the nozzle vane interior walls. This gap is controlled by the height of ribs 64 to promote maximum cooling. The air passing from holes 88 cools the aft end of the vanes 46.

It should be noted that the discharge of air from the blunt trailing edge of the vanes 46 tends to fill up the void caused by the blunt trailing edge thereby minimizing turbulence. This turbulence is further minimized by the fact that the air flowing across the vanes 46 follows the laws of free vortex motion. As a result, the air accelerates as it moves toward the trailing edge of the blades. This acceleration of air causes any turbulence that would be created by the blunt trailing edge to be minimized.

The above nozzle design provides a highly effective means of cooling the turbine nozzle assembly in a centripetal turbine engine without extracting a large portion of air for cooling purposes. The following figures are presented for illustration purposes only and are not intended to limit the application of the present invention. With this assembly it is possible to have an effective nozzle cooling by having flow of five percent of the total flow from the compressor through the vanes and a two percent of the flow through the vanes 46 bled into the hot gas stream. Thus, it can be seen that the above arrangement provides a highly effective cooling scheme with a minimum of lost energy.

The baffle assembly 56 used with the turbine nozzle vanes 46 can be manufactured and installed at a fraction of the cost of present fabricated baffles. This is a particularly important advantage for small gas turbine engines because the high cost of prior nozzle cooling arrangements has prevented the widespread application of the gas turbine engine to commercial application. While the cooling air slot in the baffle is easily formed, it nevertheless has an accurately controlled opening.

The above engine utilizes an outer casing for conveying air from the compressor to the combustor assembly. This enables the wall 38 to be merely immersed in the chamber 26 to receive the supply of cooling air for the vanes 46. There are different types of engine arrangements that use, for example, a scroll-type connection between the compressor and the combustor 30. In this type of engine a cooling air plenum chamber may be connected to the first wall 38 and to the scroll from the combustor, as will be apparent to those skilled in the art.

While the preferred embodiment of the present invention has been shown, it will be apparent to those skilled in the art that the invention may be used with modificatons other than those specifically shown without departing from the spirit of the present invention. Accordingly, its scope should be determined solely by the appended claims.

Having thus described the invention, what is claimed as novel and desired to be secured by Letters Patent of the United States is:

1. A gas turbine engine comprising:
   a forward compressor for pressurizing air;
   a centripetal turbine wheel aft of said compressor;
   a combustor receiving air from said compressor and generating a hot gas stream, said combustor being aft of said turbine wheel;
   duct means extending forward from said combustor to the periphery of said turbine wheel for passage of said hot gas stream, said duct means having an outlet portion comprising first and second spaced walls forming an annular generally radially inward entry to the periphery of said turbine wheel, said walls extending radially outward and the second of said walls being aft of said first wall, said duct means having a portion connected to said second wall at its radially outer end and curling aft radially inward adjacent said outlet portion;
   a plurality of generally airfoil shaped vanes positioned around the periphery of said turbine wheel and having their ends supported by said first and second spaced walls for directing flow of said hot gas stream toward said turbine wheel;
   means for forming cooling passageways through said first wall, said vanes and said second wall;
   means for providing a flow path from said compressor to said first wall whereby a cooling flow of air passes aft through said vanes from the first towards and through the second wall and impinging on said curled portion of said duct means, said flow then passing to said combustor;
   means for bleeding a relatively small portion of the air passing through said vanes into the hot gas stream flowing toward said turbine wheel so that said vanes are cooled.

2. Apparatus as in claim 1 wherein said means for providing a flow path from said compressor comprises an outer casing connected to said compressor and surrounding said turbine wheel, said combustor and said duct means.

3. Apparatus as in claim 1 wherein said cooling passageway means comprises:
   a longitudinal opening extending through said first wall, each of said vanes and said second wall;
   baffle means positioned in each of said openings so as to form a center through passage in said longitudinal opening and a surrounding chamber defined by said baffle means and the walls of said longitudinal opening.

4. Apparatus as in claim 3 wherein said bleed means comprises:
means for connecting said center through passage to said chamber; and
means for providing bleed passages from said chamber to said hot gas stream.

5. Apparatus as in claim 4 wherein:
said connecting means comprises an elongated slot in said baffle means and positioned longitudinally with respect to the longitudinal opening extending through each of said vanes to direct flow from said center through passage toward the upstream end of said vane and into said chamber;
said bleed passage means comprise a plurality of passages extending from said chamber to the downstream portion of said vane for passing cooling air to the hot gas stream flowing toward the periphery of said impeller.

6. Apparatus as in claim 5 wherein said passages in the downstream portion of said vanes extend to a blunt downstream edge of said vane whereby the cooling air thus discharged from said vanes minimizes the build-up of turbulence adjacent the downstream edge of said vane.

7. Apparatus as in claim 5 wherein said baffle means comprises a folded sheet having its crease adjacent the downstream portion of and extending longitudinally through said vane to form opposing walls having their edges positioned a given distance from one another adjacent the upstream portion of said vane to form said elongated slot for cooling air.

8. Apparatus as in claim 7 further comprising means for positioning said folded sheet with respect to the openings through said vanes.

9. Apparatus as in claim 8 wherein said longitudinal openings have side walls converging toward the downstream end of the vanes and wherein said positioning means comprises ribs projecting outwardly from said folded walls for abutting the side walls of said opening and tabs extending from the forward end of said folded walls so that said ribs are maintained against the side walls of said longitudinal opening.

10. Apparatus as in claim 9 wherein said positioning means further comprises:
tabs extending from the ends of said folded sheet and through the openings in said first and second walls of said duct means;
washers lying over the openings in said first and second walls of said duct means and having openings through which said end tabs of said folded sheet extend, said tabs being bent over said washers to hold said folded sheet in place.

11. A baffle assembly for a hollow turbine nozzle vane across which a hot gas stream is passed radially inward to the periphery of a centripetal turbine wheel, said baffle comprising a unitary sheet element folded for positioning in the interior of said vane, said sheet element having opposing side walls having formed portions on the edges of the walls so that when they are folded to about one another an elongated opening for cooling air is defined.

12. A baffle assembly in claim 11 for use with a vane having interior side walls converging toward the downstream end of the vane, said baffle having the crease of its folded side walls adjacent the downstream end of said vane and further comprising:
integral ribs projecting outwardly from said opposing side walls of said baffle for abutting the side interior walls of said vane;
at least one tab extending from the edge of one of the side walls of said baffle for maintaining said ribs against the side walls of said vane.

13. A baffle assembly as in claim 11 for use with a vane having its interior connected to the exterior by openings in opposite ends of the vane and wherein said baffle assembly further comprises:
tabs extending from the ends of said folded side walls and through the openings in said vane;
washers positioned over the ends of said vanes and having openings through which said tabs extend, said tabs being bent over said washers to retain said baffle assembly in said vane;
whereby a central through passage and surrounding chamber are defined in said vane.

References Cited

UNITED STATES PATENTS

| | | | |
|---|---|---|---|
| 2,924,937 | 2/1960 | Leibach | 60—39.36 |
| 3,540,810 | 11/1970 | Kercher | 415—115 X |
| 3,301,527 | 1/1967 | Kercher | 415—115 |
| 3,301,526 | 1/1967 | Chamberlain | 60—39.66 |
| 3,304,713 | 2/1967 | Szydlowski | 60—39.66 X |
| 3,199,294 | 8/1965 | Hagen | 60—39.66 X |
| 3,321,912 | 5/1967 | Oprecht | 60—39.66 X |
| 3,381,471 | 5/1968 | Szydlowski | 60—39.36 X |
| 3,169,369 | 2/1965 | Holl | 60—39.36 |

ALLAN D. HERRMANN, Primary Examiner

U.S. Cl. X.R.

60—39.39; 415—115